Figure 1:
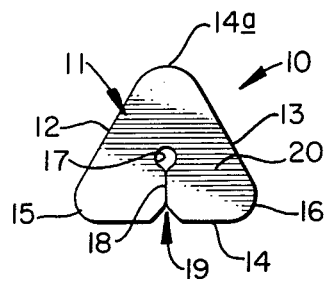

United States Patent [19]

Norwood

[11] 4,121,368

[45] Oct. 24, 1978

[54] POINT PADS FOR TREBLE POINT FISHHOOKS

[76] Inventor: James R. Norwood, 321 High Brook Dr., Richardson, Tex. 75080

[21] Appl. No.: 801,024

[22] Filed: May 27, 1977

[51] Int. Cl.² .................................................. A01K 83/00
[52] U.S. Cl. ...................................... 43/43.2; 43/42.1; 43/57.5 R
[58] Field of Search .................. 43/57.5 R, 42.1, 43.2, 43/42.4, 42.43, 43.2, 43.6

[56] References Cited

U.S. PATENT DOCUMENTS

| | | | |
|---|---|---|---|
| 2,482,881 | 9/1949 | Sonner, Jr. | 43/57.5 R |
| 2,685,756 | 8/1954 | Mowbray | 43/57.5 R |
| 2,711,611 | 6/1955 | Miner | 43/43.2 |
| 2,771,704 | 11/1956 | Biggs | 43/43.2 |
| 3,273,279 | 9/1966 | Norton et al. | 43/57.5 R |
| 3,722,128 | 3/1973 | Tremblay | 43/42.1 |

FOREIGN PATENT DOCUMENTS 887,705 10/1964 Canada ...................................... 43/42.1

Primary Examiner—Edgar S. Burr
Attorney, Agent, or Firm—Warren H. Kintzinger

[57] ABSTRACT

A pad of general equilateral triangle shape is formed with a central through-aperture and with a through-slot extending from the aperture to one side of the pad, with a notch extending inwardly from the pad side and communicating with the slot. The slot facilitates placement of the pad over the shank of a hook attached to a line or to a fishing lure device, with the hook points being imbeddable into the underside of the pad. Individual pad conformation facilitates production of multiple pads in nested interrelationship as by incomplete die stamping, with minimal waste of material, while permitting choice of selected interconnected groupings of pads for ease of packaging, marketing, and user handling and storage.

8 Claims, 8 Drawing Figures

POINT PADS FOR TREBLE POINT FISHHOOKS

This invention relates in general to fishing gear, and in particular, to a fishhook point guard device.

Fishhook guards of varying form, application and complexity are employed to be engageable with fishhook points to provide protection to the angler when handling hooks and/or hook-bearing lures, as well as to protect hook points from dulling due to contact with tackle boxes and the contents therein. In addition, fishhook point guards are employed to prevent tangling of hooks and lures, as in a tackle box.

From the simple expedient of placing a cork stopper or piece of cork over each hook point, the art has evolved into various shapes and forms of unitary devices which may be placed on either single-point or multiple-point hooks, all to provide a cover for the hook points to protect both the hook and the angler.

Known devices available as hook guards accomplish the desired end result by employing relatively complex geometries, as concerns configurations of the guard device. The geometries limit production methods to that of molding or molding followed by other cutting and shaping operations, with attendant production costs. Other known devices which might be produced by a relatively simple and less expensive one-step die-cutting operation, give rise to appreciable waste material, with attendant costs.

The average angler today keeps a tackle box complete with myriads of hooked lures. Hooks of multiple-hook lures notoriously become entangled among themselves and with hooks of other lures. Even with resplendent multi-chambered tackle boxes, the hooks on multiple-hooked lures become inter-entangled, and the angler is always subject to snagging himself when attaching lures to his line. As a result, a large number of hook-point guards is needed and a low cost, efficient guard is obviously desirable.

An appreciable part of the cost of products is in the handling, distribution, and display of the products. Individual packaging of items as well as packaging of a variety of multiple quantities of individual items adds attendant increase to price. In addition to minimization of production costs, products which may be conveniently packaged in a variety of quantities and effectively displayed, result in cost savings to the consumer.

It is, therefore, a principal object of this invention to provide a simple fishhook guard device which may be multipally produced by a one-step die-cutting operation from a sheet or roll of planar raw material.

Another object is to provide a simple and inexpensive fishhook guard useable with single-point or multiple-point hooks, either attached, or unattached, which guard may be manufactured by a one-step die-cutting operation with minimal loss of material in the form of scrap, i.e., a maximum utilization of raw material with attendant decrease in cost of end product.

A further object is the provision of a fishhook guard device constructible from a sheet of raw material and having a face geometry permitting nesting of plural face-defining geometries on the sheet, such that multiple ones of the guards may be produced by die cutting with minimal material loss.

A still further object is the provision of a fishhook guard producible in nested, incomplete die-cut multiples, to facilitate packaging, display and user storage of same.

Features of this invention useful in accomplishing the above objects, include a pad of general equilateral shape with at least one side comprising a resilient foam-like material into which a fishhook point or points may be selectively embedded and frictionally retained. A hook shank receiving aperture extends through the body member at a central location with respect to the sides of the body, and a through-slot is formed through the body from the midpoint of one side, with the slot communicating with the central aperture. In combination with a hook to be protected, the hook shank is receivable through the slot into the central aperture, with the pad then positioned to address and receive the hook point or points. With the pad being entirely of the resilient foam material, there is no "top" and "bottom" to the guard and installation on a hook is simplified, as in darkness. With the pad comprised of a layer of relatively higher density material on one side of the foam-like material, the pad is placed with the higher density layer away from the hook points and provides for user protection during hook-seating in the underside. The guards are readily producible in selected multiple, material interconnect retained quantities by a one-step die-cutting operation.

Specific embodiments, representing what are presently regarded as the best mode of carrying out the invention are illustrated in the accompanying drawings.

Figure 3:
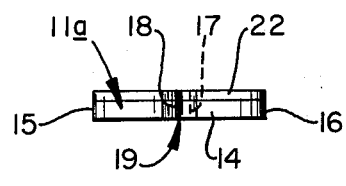
Figure 2:
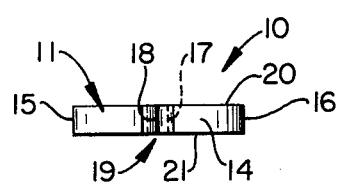
Figure 4:
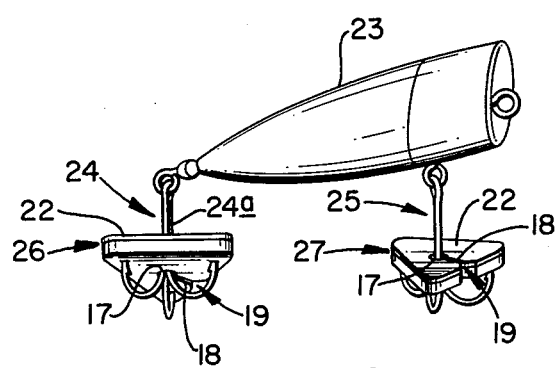
Figure 5:
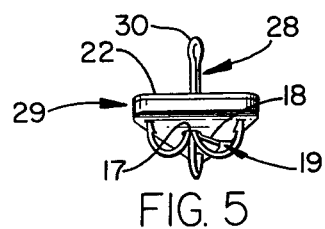
Figure 6:
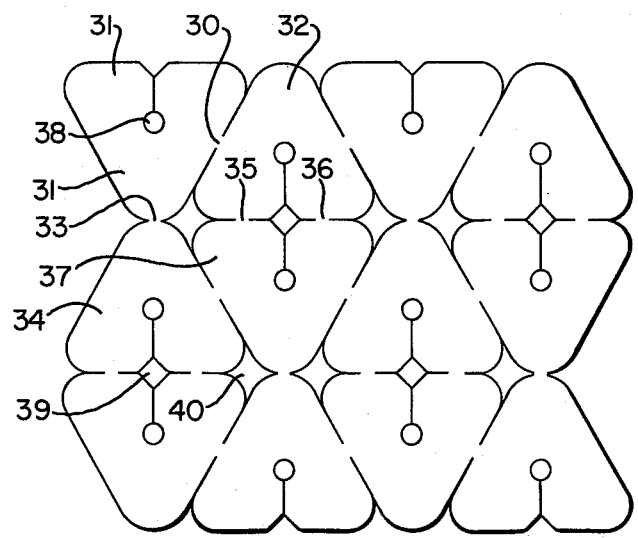
Figure 7:
Figure 8:

In the drawings:

FIG. 1 represents a top view of a fishhook guard in accordance with the invention;

FIG. 2, a side view of the guard as viewed from the bottom of FIG. 1;

FIG. 3, a side view of a multilayered guard body alternative as viewed from the bottom of FIG. 1;

FIG. 4, an isometric view of a multiple-hooked lure with hook point guards in place on each hook;

FIG. 5, an isometric view of a single unattached triple-point hook with hook guard in place;

FIG. 6, a top view of a sheet of raw material showing multiple nested guard body members as formed by incomplete die-cutting, with material interconnects between body members, and with waste material intact;

FIG. 7, a cross section of single layer body material which may be die-cut as in FIG. 6; and FIG. 8, a cross-section of a two-layer body material which may be die-cut as in FIG. 6.

Referring to the drawings:

The fishhook guard 10 of FIG. 1 is shown as a generally equilateral triangle shaped body member 11 comprised of resilient material such as foam plastic, rubber, or cork. Respective pairs of sides 12, 13 and 14 define apices of an equilateral triangle. The apices 14a, 15 and 16 are preferably rounded-off with a predetermined radius of curvature as shown.

An aperture 17 extends through the body 11 at a location centrally disposed with respect to the respective body sides 12, 13 and 14. A through-slit or slot 18 (referring also to FIG. 2) extends through the body 11 from the midpoint of one side 14 and into communication with the central aperture 17. A generally V-shaped notch 19 is formed into side 14 and symetrically disposed with respect to slot 18.

As shown in FIG. 2, the body member 11 has a uniform thickness and comprises paralleled planar top and bottom faces 20 and 21 of like equilateral triangle geometry as shown in FIG. 1. It is evident, then, that the device might be die-cut from a sheet of planar material; since the surfaces of the sides, apices, V-notch, slot and central aperture are perpendicular to the respective top and bottom faces 20 and 21 of the body 11.

In the alternative body member construction depicted in FIG. 3, the body may comprise a planar construction including a lower portion 11a of the resilient material onto which is bonded a top layer 22 of material having a higher density. Top layer 22 is a thin layer relative to the thickness of the underlying resilient less-dense material 11a. The alternative body member make-up is seen to be of uniform thickness and thus permits die-cutting of a sheet of the composite material to produce the hook guard.

In usage for its intended purpose, the guard may be placed on a treble-hook as shown in FIG. 4. Here a lure 23 carries two treble-hooks 24 and 25, each with hook eyes connected with lure mounted eyes. Hook 24 is shown with a hook guard 26 in protective position, with the shank 24a of the hook received in the central aperture 17 and with the respective hook points embedded in the bottom face surface.

As best seen with reference to the second hook 25 of FIG. 4, having a hook guard 27 in place, the guard 27 is readily placeable on the hook by sliding the hook shank through the slot 18 and into top central aperture 17 with the guard raised upwardly on the hook shank such that the hook points clear the under face 21 of the guard. With slot 18 preferably being of minimal width, i.e., a slit, the hook shank is receivable through the slot 18 upon deformation of the body member resilient material, and thus retainable to a sufficient degree on the hook shank to aid in angular rotation of the guard for surface orientation of hook points with respective apices of the triangular shaped body, whereupon a downward pressure on the body may be exerted to embed the hook points into the resilient body material.

The hook point guards in FIG. 4 are depicted as being of the alternative two-layer embodiment of FIG. 3, with the upper, more dense layer 22 providing a means for preventing hook point penetration through the body, while permitting a less dense under layer to be utilized than in the case where but a single layer body of resilient material is used, as in FIG. 2. The more dense top layer 22 protects both the angler and the hook points, by impeding, if not precluding, a hook point from being pressed completely through the guard body. Additionally, the more dense upper layer 22 provides for shape retention and wear prevention of the less dense under layer, thus preserving structural integrity of the guard throughout repeated usage.

It is also apparent from FIG. 4, that the V-notch 19 aids in orienting the hook shank for passage through the slot 18 into the confines of central aperture 17. Further, in the case of a single layer body material per FIG. 2, the top and bottom of the guard are identical as to utilitarian purpose, conformation and function, obviating the need for proper top-bottom orientation when installing the guard, and thus simplifying installation.

In FIG. 5, an unattached treble hook 28 is shown with a guard member 29 in place on the hook. For this usage, the slot 18 is not required for guard installation, since the hook eye 30 may be directly inserted through the central aperture 17. For unattached hook installation purposes, it is preferable though not necessary, that the central aperture 17 have a diameter less than the hook eye dimension, such that the guard is reasonably captivated on the hook, once installed.

As aforementioned, the average angler has need for an appreciable quantity of hook guards and low price is of prime concern. In addition to the utilitarian aspects of the point guard heretofore described, the geometry of the guard lends itself to uniquely simple production methods and maximum utilization of raw material, each contributing to low cost.

Referring to FIG. 6, the guard may be produced in multiples by nesting the equilateral triangular face geometries. A simple die of the cutting type may be used in a one-step cutting operation to produce nested ones of the guards. Using principles commonly employed, a dinking die may be used, with the nested geometries defined by strip tool steel edge-mounted on a plate with opposite edge ground to a knife point. It is apparent from FIG. 6 that waste material is minimal due to the nested geometry permissible by the triangular face shapes. The die may completely define the entire outline geometry shown by the exampled dozen guard grouping of FIG. 6, with the cutting being less than complete, such that material interconnects remain on the lower surface of the grouping. Alternatively, and/or additionally, the die cutting edge may be interrupted (have gaps which leave material interconnect portions between the guard body defining cuts). Using any of these alternative cutting procedures, various groupings of interconnected nested ones of the guards may be selected for marketing, with the marketed grouping facilitating packaging and handling of the group. Individual ones, or selected groups of guards, may be removed from a group by simple rupturing of the remaining material interconnects between individual ones or selected groupings.

FIG. 6 shows a dozen interconnected guards which might be marketed. Material interconnects, such as interconnect 30 between guards 31 and 32, interconnect 33 between guards 31 and 34, and interconnects 35 and 36 between guards 32 and 37, are exampled. Scrap material, such as areas 38 defining central apertures, areas 39 and areas 40 may advantageously be retained with the guard grouping, as by appropriate residual material inconnects, to further simplify production costs by minimizing clean-up. The intact package of twelve guards, as shown in FIG. 6, may be flat packed for marketing, and in a transparent package to enhance display of the item. It may thus be seen that the geometry of the guard provides for simple, low cost production, expedites packaging, and enhances marketability. Further, the user may remove, by rupturing from the interconnected grouping, individual guards as needed, with the remaining ones of the group staying in a flat, easily stowable, interconnected group.

With reference to FIG. 7, the guards may be die-cut in interconnected multiples from a sheet or roll of resilient material 11' which might comprise plastic foam. Alternatively, the raw material may comprise (FIG. 8) a planar sheet of resilient material 41 having bonded thereto an overlayer 42 comprised of a comparatively more dense resilient material, for the purposes herein described.

Whereas this invention is herein illustrated and described with respect to particular embodiments thereof, it should be realized that various changes may be made without departing from essential contributions to the art made by the teachings hereof.

I claim:

1. A fishhook point cover and guard member comprising a generally equilateral triangular shaped body of uniform thickness, an aperture of predetermined diameter extending between opposed planar face surfaces of said body and centrally disposed with respect to the respective sides of said body; a through-slot formed through said body and extending between respective body face surfaces from the midpoint of one of said body sides into communication with said aperture, and at least a portion of said body, including one face surface thereof, comprising a first resilient material into which a pointed member is selectively embeddable and frictionally retainable; and with the guard member in combination with others of said guard members arranged in contiguous nested relationship; with predetermined extents of side surfaces defined by die-stamped through-cuts, and a commonality of portions of respective side surfaces thereof defined by incomplete die-stamped cuts through a sheet of the body defining material; and with material interconnects between body defining portions of said sheet being rupturable to permit selective removal from said sheet of individual ones and/or groups of contiguous ones of the body defining portions of said sheet.

2. The guard member of claim 1, with respective apices of said triangular body member being rounded to define a predetermined radius of curvature.

3. The guard member of claim 2, with a material-void-defined groove extending inwardly from the through-slot communicating one of said body sides and symetrically disposed with respect to said through-slot.

4. The guard member of claim 3, with said through-slot having a width substantially less than the cross-sectional expanse of the shank of a fishhook which may be selectively inserted into said through-slot into communication with said aperture via elastic deformation of said through-slot.

5. The guard member of claim 3, with said body comprised entirely of said first resilient material.

6. The guard member of claim 3, with one of said body member faces comprising a further layer of material having a density exceeding that of said first resilient material, with said further layer bonded to said first resilient material.

7. The combination of claim 1, with a further layer of material having a density exceeding that of said first resilient material, said further layer bonded to one face surface of said first resilient material.

8. The guard member of claim 1, with said body member comprised entirely of said first resilient material.

* * * * *